United States Patent [19]

Harris

[11] Patent Number: 5,449,029
[45] Date of Patent: Sep. 12, 1995

[54] FILL LIMIT VALVE ASSEMBLY

[75] Inventor: Robert S. Harris, Connersville, Ind.

[73] Assignee: Stant Manufacturing Inc., Connersville, Ind.

[21] Appl. No.: 241,186

[22] Filed: May 11, 1994

[51] Int. Cl.⁶ .............................. B65B 1/30; B65B 3/28
[52] U.S. Cl. ..................................... 141/198; 141/303; 141/59; 137/202; 220/86.2; 220/748
[58] Field of Search .................. 141/198, 303, 51, 59, 141/44, 45, 46; 137/202, 587; 220/86.2, 748

[56] References Cited

U.S. PATENT DOCUMENTS

| | | | |
|---|---|---|---|
| 4,760,858 | 8/1988 | Szlaga | 137/43 |
| 4,974,645 | 12/1990 | Johnson | 141/198 |
| 4,991,615 | 2/1991 | Szlaga et al. | 137/43 |
| 5,028,244 | 7/1991 | Szlaga | 137/202 |
| 5,065,782 | 11/1991 | Szlaga | 137/39 |
| 5,215,132 | 6/1993 | Kobayashi | 141/44 |
| 5,234,013 | 8/1993 | Roetker et al. | 137/587 |
| 5,261,439 | 11/1993 | Harris | 137/587 |

Primary Examiner—Henry J. Recla
Assistant Examiner—Steven O. Douglas
Attorney, Agent, or Firm—Barnes & Thornburg

[57] ABSTRACT

An apparatus for controlling fuel vapor discharge from within a vehicle fuel tank includes a valve housing having vapor inlet and outlet openings, a float valve in the valve housing, and a skirt extending around the valve housing to define an annular channel therebetween. The float valve is movable in the valve housing to open and close the vapor outlet opening. The skirt has a bottom edge adapted to lie in spaced-apart relation to a top wall of a fuel tank carrying the valve housing. The vapor inlet opening lies between the outlet opening and the bottom edge of the skirt, which edge is positioned to lie in coextensive relation with a top surface of liquid fuel in the interior region of the fuel tank equal to a predetermined maximum fuel capacity of the fuel tank. The skirt is configured to cause a pump nozzle to shut off at the proper time during refueling.

34 Claims, 3 Drawing Sheets

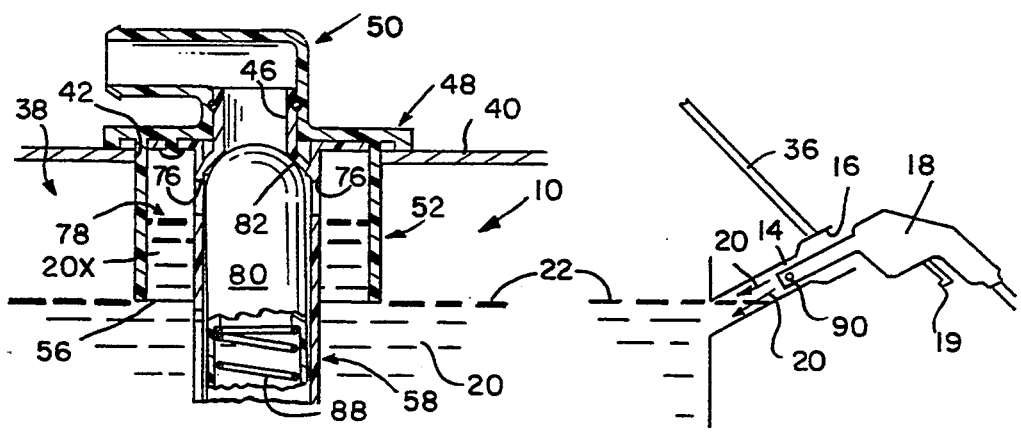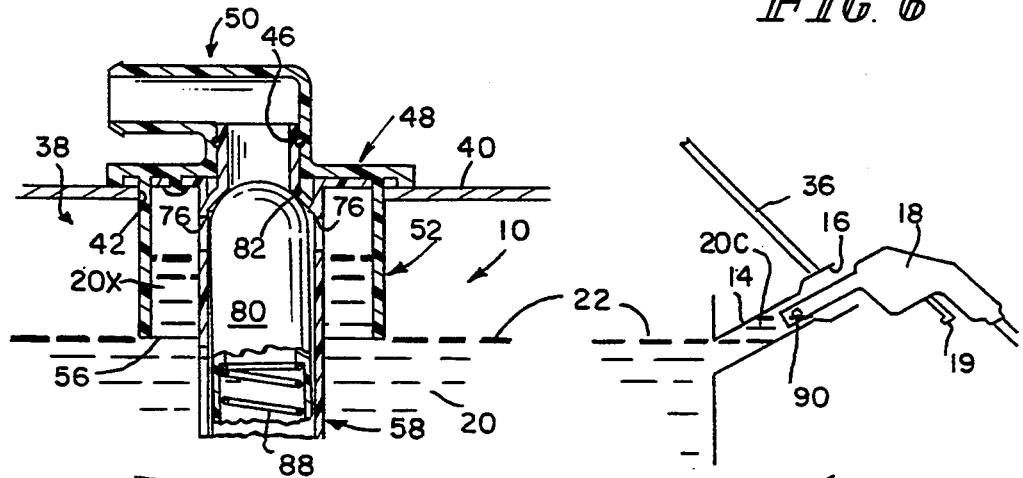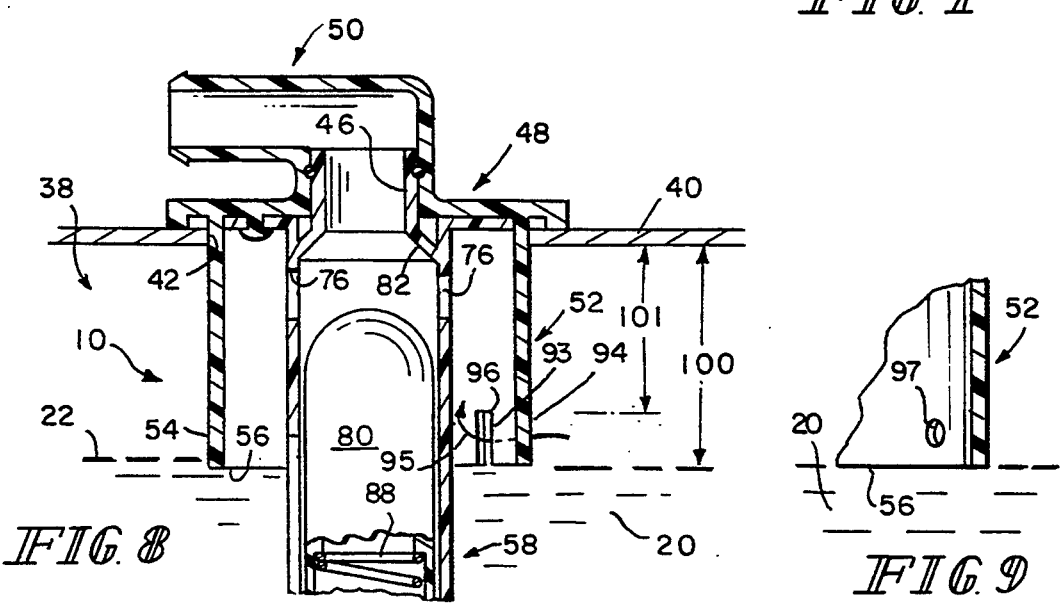

FILL LIMIT VALVE ASSEMBLY

BACKGROUND AND SUMMARY OF THE INVENTION

The present invention relates to tank pressure control apparatus, and particularly to venting apparatus which operates to seal the vapor space in the interior of a fuel tank during refueling and reopens at some point after refueling has been completed to vent the vapor space. More particularly, the present invention relates to a fill limit system for preventing overfilling of a fuel tank.

Fuel pump nozzles are known to include a fill-limiting sensor for shutting off the flow of fuel from the nozzle when the fuel tank is nearly filled. Typically, this fill-limiting sensor is triggered whenever the fuel tank is full and fuel "backs up" the filler neck to splash onto or reach the fill-limiting sensor located on the nozzle. Sometimes fuel pump operators overfill a fuel tank inadvertently in a good-faith effort to fill the tank "completely" or to purchase a quantity of fuel that can be paid for in cash without causing the operator to receive unwanted coinage in change.

It has been observed that fuel pump operators are able to manually override or bypass some fill-limiting sensors on nozzles by continuing to pump fuel after the pump nozzle has automatically shut off several times. This practice has come to be called the "trickle fill" method of introducing liquid fuel into a fuel tank. Using this well-known trickle fill method, the fuel pump operator "clicks" or squeezes the lever handle on the pump nozzle slowly two or three times in succession after automatic nozzle shutoff has occurred in order to introduce more fuel into the fuel tank without actuating the fill-limiting sensor right away. It will be appreciated that such trickle fill practices can result in overfilling the fuel tank which can effectively reduce the fuel vapor expansion capacity in the vapor space available within the filled fuel tank.

Vehicle fuel systems are known to include valves for venting the vapor space in a fuel tank. See, for example, U.S. Pat. Nos. 4,760,858; 4,991,615; and 5,028,255.

What is needed is a fill limit control system that is able to vent fuel vapor from the vapor space in a fuel tank during early stages of refueling but block introduction of any and all liquid fuel in excess of a maximum volume so as to preserve a minimum volume of the vapor space in the fuel tank once the fuel tank is filled to its maximum capacity with fuel. Ideally, this fill limit control system could be included as one component in a comprehensive Onboard Refueling Vapor Recovery (ORVR) vehicle fuel system. An ORVR system is used to manage fuel vapor recovery during all phases of vehicle use. In addition, a fill limit control system that is adaptable to permit customers some latitude to trickle-fill their fuel tanks without overfilling the fuel tanks would be welcomed by fuel customers and vehicle makers.

According to the present invention, an apparatus is provided for controlling discharge of fuel vapor from a vehicle fuel tank. The apparatus includes a valve housing mounted in a wall of the fuel tank. The valve housing is formed to include a vapor inlet opening communicating with an interior region of the fuel tank, a vapor outlet opening, and a passageway interconnecting the vapor inlet opening and the vapor outlet opening.

The apparatus also includes a float valve and a skirt. The float valve is disposed in the valve housing and movable between an open position allowing flow of tank fuel vapor through the vapor outlet opening and a closed position preventing flow of tank fuel vapor through the vapor outlet opening. The skirt is positioned to lie inside the fuel tank and extend around the valve housing and the vapor inlet opening in the valve housing to define an annular channel lying around the valve housing and conducting fuel vapor from the interior region of the fuel tank to the vapor inlet opening.

The skirt has a bottom edge lying in spaced-apart relation to the top wall of the fuel tank to locate the vapor inlet opening in the valve housing in a position between the top wall of the fuel tank and the bottom edge. The bottom edge of the skirt is positioned to lie in coextensive relation with a top surface of liquid fuel in the interior region of the fuel tank once the volume of liquid fuel in the fuel tank is equal to a predetermined maximum fuel capacity of the fuel tank.

In preferred embodiments, the skirt includes a top wall coupled to the valve housing and an annular side wall appended to the top wall. The annular side wall is positioned to surround the valve housing and define the annular channel therebetween. During refueling, fuel vapor in the fuel tank vapor space will be vented from the fuel tank along a path through the annular channel, vapor inlet opening, passageway, and the vapor outlet opening. Such venting will stop automatically once liquid fuel in the fuel tank rises to a level that is high enough to occlude or close the opening into the annular channel.

In effect, the skirt causes the pump nozzle to shut off at the proper time during refueling due to sudden restriction of the exit vapor flow as the rising level of liquid fuel in the fuel tank covers the annular opening into the annular channel at the bottom of the skirt. This allows the fuel pump operator a small amount of trickle fill without materially raising the liquid fuel level in the fuel tank.

The annular side wall of the skirt extends downwardly to position the bottom edge in spaced-apart relation to the top wall of the fuel tank. During refueling, the rising liquid fuel will reach the bottom edge of the skirt and close the annular opening into the annular channel before it ever reaches the top wall of the fuel tank. Once the opening into the annular channel is closed, no more fuel vapor can be vented from the vapor space in the fuel tank through the annular channel, vapor inlet opening, passageway, and vapor outlet opening. If a pump operator continues to pump fuel into the fuel tank through the filler neck, the pressure in the vapor space will rise and force some liquid fuel in the fuel tank up through the filler neck to reach and trigger the fill-limiting sensor on the pump nozzle.

Advantageously, it is possible to set the maximum fuel capacity of any fuel tank easily by simply mounting a fill-limiting valve assembly in accordance with the present invention so that the bottom edge of the skirt is fixed to lie in coextensive relation with a top surface of liquid fuel in the fuel tank once the volume of liquid fuel in the fuel tank is equal to a predetermined maximum fuel capacity of the fuel tank. It will be understood that use of a bottom edge of the skirt to prevent overfilling of the fuel tank also functions to preserve a minimum volume for the vapor space between the top wall of the fuel tank and the top surface of liquid fuel in the fuel tank.

In use, the float valve is expected to rise in the valve housing and close the vapor outlet opening only if a pump operator uses the trickle fill method to try and introduce more liquid fuel into the tank once the automatic shutoff sensor on the pump nozzle has operated to shut off the pump. In such a case, any extra fuel added into the fuel tank will cause the fuel level inside the annular channel to rise, thereby causing the float valve to rise to its closed position. Illustratively, a spring underneath the float valve provides a float-lifting force in addition to buoyancy forces generated by the rising liquid fuel to move the float valve in the annular channel to its closed position.

Avantageously, a limited amount of trickle fill is permitted by a fill limit valve in accordance with the present invention. In use, after the first automatic pump nozzle shutoff, a pump operator can click the pump nozzle a couple of times to introduce a bit more fuel into the tank. As noted above, this extra fuel displaces fuel already in the tank causing the level of fuel in the annular channel to rise without raising the level of the fuel in the fuel tank outside of the annular channel. In another embodiment, a vertical slot or a small aperture can be formed at the bottom edge of the skirt to allow additional limited trickle fill capability for pump operators without overfilling the tank.

Additional features and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 6 is a view similar to FIGS. 3-5 showing that if a pump operator continues to use the pump nozzle to add more and more fuel into the filler neck, the level of fuel in the annular channel between the skirt and the valve housing will ultimately rise to a point high enough to apply a buoyancy force to the float valve that adds to a lifting force generated by the compression spring under the float valve to move the float valve up to its vapor outlet opening-closing position;

FIG. 7 is a view similar to FIGS. 3-6 showing that if the pump operator continues to trickle fill even after the vapor outlet opening is closed by the float valve as shown in FIG. 6, the trickle-filled liquid fuel will back up through the filler neck to once again shut off the pump nozzle;

FIG. 8 is a view of another embodiment in accordance with the present invention showing the addition of a vertical slot to the annular side wall of the skirt to provide the pump operator with greater latitude to trickle fill liquid fuel into the fuel tank without causing the liquid fuel in the fuel tank to rise above a predetermined maximum level in the fuel tank; and FIG. 9 is a view showing an aperture formed in the skirt as an alternative to the vertical slot illustrated in FIG. 8.

DETAILED DESCRIPTION OF THE DRAWINGS

Fuel-dispensing nozzles of the type used to fill vehicle fuel tanks typically include meals for triggering shut off of fuel flow from the nozzle upon exposure of a fill-limiting sensor provided on the tip of the nozzle to liquid fuel in the filler neck. Thus, to prevent overfilling of the fuel tank, it is necessary for liquid fuel to move up in the filler neck toward the fuel-dispensing nozzle during refueling as soon as the tank is nearly full so that enough liquid fuel will be present in the filler neck to splash onto the tip of the nozzle at just the right time and actuate the fill-limiting sensor in the nozzle to stop further delivery of fuel from the nozzle into the tank.

Figure 1:
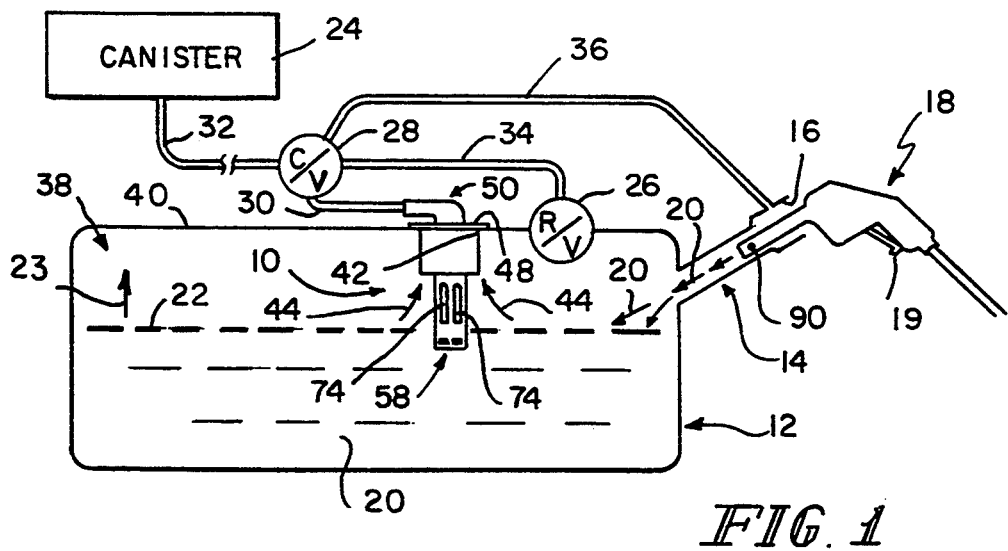
FIG. 1 is a diagrammatic view of an Onboard Refueling Vapor Recovery (ORVR) system incorporating an embodiment of a fill limit valve assembly in accordance with the present invention therein.

A presently preferred embodiment of an Onboard Refueling Vapor Recovery (ORVR) fuel system is shown in FIG. 1. A fill limit valve 10 in accordance with the present invention is included in this ORVR system and is mounted preferably as shown in a fuel tank 12 having a filler neck 14. Illustratively, the filler neck 14 has an open mouth 16 for receiving a fuel-dispensing pump nozzle 18 during refueling. This nozzle 18 is used by a pump operator to introduce liquid fuel 20 into fuel tank 12 during vehicle refueling. As tank 12 is filled during refueling, the top surface 22 of liquid fuel will rise in direction 23 as shown in FIG. 1.

The ORVR system also includes a vapor recovery canister 24 designed to capture and store fuel vapors that are displaced and generated in the fuel tank during a typical vehicle refueling operation. The ORVR system also illustratively includes a run-loss valve 26 and a central control valve 28. Reference is hereby made to U.S. patent application Ser. No. 07/822,616, now U. S. Pat No. 5318,069, filed Jan. 17, 1992, to Robert Harris for a description of a suitable central control valve of a type which could be used as control valve 28. Reference is also made to U.S. Pat. No. 5,065,782 for a description of a suitable run-loss valve which could be used as run-loss valve 26.

The control valve 28 operates to direct fuel vapor from the fuel tank 12 to the canister 24. The fill limit valve assembly 10 is coupled to control valve 28 by vapor tube 30 so that fuel vapor venting from fuel tank 12 will be able to reach canister 24 after passing first through vapor tube 30, control valve 28, and vapor tube 32 interconnecting control valve 28 and canister 24.

The run-loss valve 26 is also connected to control valve 28 by vapor tube 34 so that any fuel vapor venting from fuel tank 12 through run-loss valve 26 can be communicated to canister 24 through vapor tube 34, control valve 28, and vapor tube 32. Control valve 28 is also connected in fluid communication to filler neck 14 through tube 36 to enable control valve 28 to "determine" that the closure cap (not shown) that is used to close the inlet mouth 16 on filler neck 14 has been removed at the beginning of a refueling cycle. The control valve 28 will be exposed to tank pressure through tube 36 until the closure cap is removed from filler neck 14. Once the closure cap is removed, atmospheric pressure will be communicated to control valve 28 through tube 36.

Figure 2:
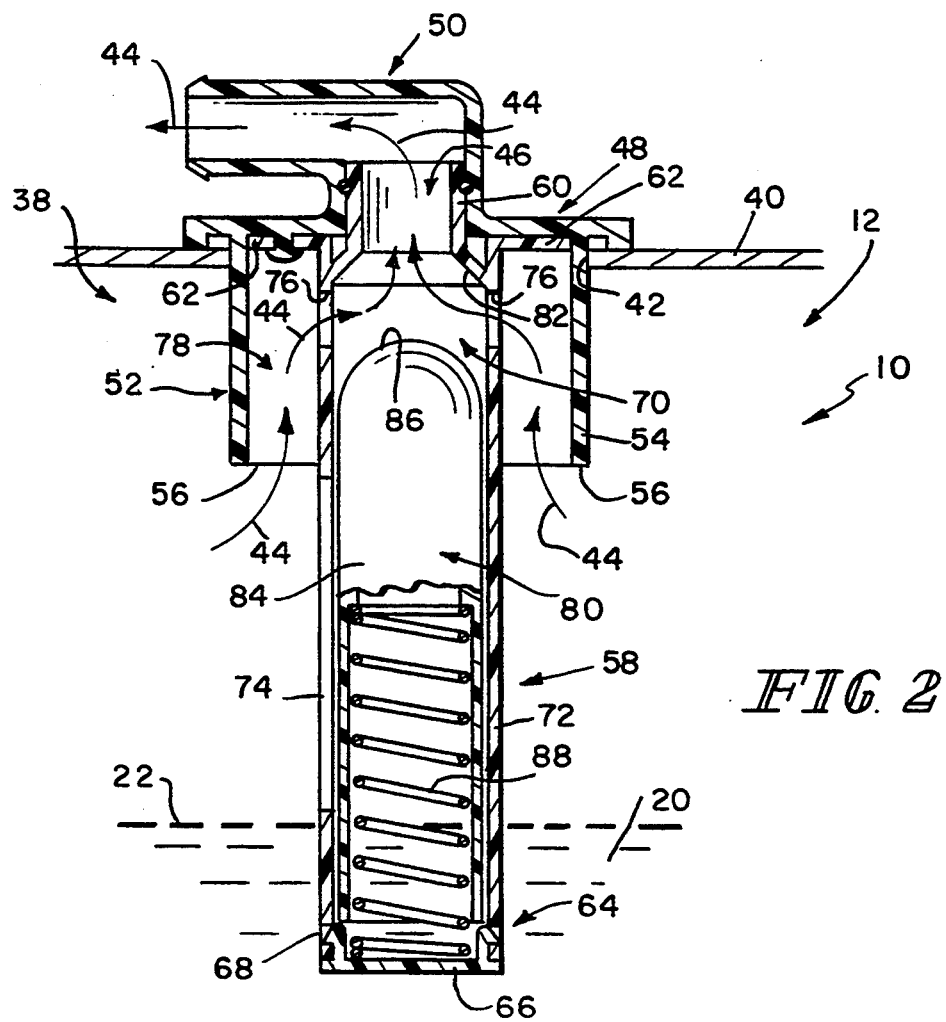
FIG. 2 is an enlarged transverse sectional detail view of the fill limit valve assembly of FIG. 1 mounted to a top wall of the fuel tank and showing a short annular skirt around a long annular valve housing and showing venting of fuel vapor from the vapor space in the fuel tank during refueling through a venting outlet opening provided at the top of the valve housing.

As shown in FIG. 1, a vapor space 38 is provided in an upper interior region inside fuel tank 12 between a top wall 40 of the fuel tank 12 and the top surface 22 of the liquid fuel 20 in the fuel tank 12. The fill limit valve assembly is configured to be mounted in an aperture 42 formed in the top wall 40 of the fuel tank as shown in FIGS. 1 and 2. This fill limit valve assembly 10 is configured to vent fuel vapors 44 extant in vapor space 38 through a vapor outlet opening 46 provided in the top of the fill limit valve assembly 10 as shown in FIG. 2 during refueling.

Referring now to FIG. 2, the fill limit valve assembly 10 includes a top wall 48 sized to cover and close the tank opening 42 and mounted to an exterior surface of the top wall 40 of fuel tank 12. An L-shaped fuel vapor outlet nozzle 50 is appended to an upper portion of top wall 48. This outlet nozzle 50 is coupled to control valve 28 by vapor tube 30 as shown in FIG. 1.

An annular skirt 52 is appended to the underside of top wall 48 and arranged to extend through tank outlet opening 42 in a downward direction into vapor space 38 toward the top surface 22 of liquid fuel 20 in the fuel tank 12 as shown in FIG. 2. The skirt 52 has an annular side wall 54 having a top end appended to the top wall 48 and an opposite bottom edge 56. Illustratively, the bottom edge 56 is an endless annular rim that lies in a plane that is situated to lie in spaced-apart parallel relation to a plane defined by the top wall 40 of fuel tank 12. Preferably, the nozzle outlet 50, top wall 48, and annular skirt 52 are molded of plastics material to provide a unitary structure as shown best in FIG. 2.

The fill limit valve assembly 10 also includes a valve housing 58 that has an upper end 60 sealingly coupled to the L-shaped outlet 50 to define the vapor outlet opening 46. Illustratively, the valve housing 58 has a cylindrical tubular shape although a variety of elongated shapes would be acceptable. The valve housing 58 also includes an annular flange 62 that is positioned to lie inside the annular skirt 54 in abutting relation to the underside of top wall 48 as shown best in FIG. 2. The valve housing 58 further includes a bottom end 64 positioned to lie in spaced-apart relation from the overlying top end 60 so that the bottom end 64 will be immersed in liquid fuel 20 as the liquid fuel level rises in fuel tank 12 during refueling.

As shown in FIG. 2, valve housing 58 terminates in a bottom closure member 66 which has flanges 68 formed to snap-fit into recesses formed in the valve housing 58. A valve chamber 70 is defined in valve housing 58 between an axially extending side wall 72 of valve housing 58 and the bottom closure member 66. Preferably, the valve housing 58 and the bottom closure member 66 are each molded of a plastics material.

Side wall 72 of valve housing 58 is formed to include a plurality of axially extending inlet openings or "church windows" 74 that are positioned near the axially downward end of valve housing 58 to allow liquid fuel to pass from the fuel tank 12 into valve chamber 70. Side wall 72 is also formed to include a plurality of vapor inlet openings 76 allowing fuel vapor from vapor space 38 of the fuel tank 12 to pass through an annular channel 78 to enter into valve chamber 70. This fuel vapor can then travel through a passageway provided in a top portion of valve chamber 70 and exit valve chamber 70 through venting outlet 46 as long as a float valve 80 inside valve housing 58 is in an outlet-opening configuration as illustrated in FIG. 2.

Vapor inlet openings 76 are preferably located as far above the liquid fuel level in fuel tank 12 as practicable to minimize carryover of liquid fuel droplets in the venting fuel vapor. Valve housing 58 also includes an upwardly projecting, downwardly facing frustoconical valve seat 82 provided in an upper mounting fixture and formed to include a central aperture defining the venting outlet 46 in the valve housing 58. This valve seat 82 is positioned to lie axially above the plurality of vapor inlet openings 76 provided about the circumference of side wall 72 as shown in FIG. 2.

A float valve 80 is positioned in valve chamber 70 and is free to "float" on liquid fuel received in valve chamber 70 through inlet openings 74 and move in axial directions toward and away from valve seat 82. Float valve 80 includes an elongated body portion 84 and a dome-shaped upper cap or tip 86. Upper cap 86 is shaped and configured to seat and seal against the frustoconical valve seat 82 and block flow of fuel vapor through the venting outlet 46 from vapor space 38 into the discharge conduit 50 in response to sufficient upward movement of float valve 80 in valve chamber 70 during rising fuel levels in fuel tank 12 created by refueling. Body portion 84 is sized to rest on flanges 64 when the float valve 80 is in a static condition as illustrated in FIG. 2.

A compression spring 88 acts between bottom closure member 66 and the float valve 80 to assist in lifting the float valve 80 within the valve chamber 70 as the fuel level therein rises during refueling. Illustratively, the spring 88 is situated to lie inside valve housing 58 in a position underneath the float valve 80.

A sequence of operation of fill limit valve assembly 10 is provided in FIGS. 2–7 to illustrate how fill limit valve assembly 10 functions to prevent a pump operator from overfilling fuel tank 12 during refueling. Advantageously, fill-limit valve assembly 10 is configured to limit the maximum volume of liquid fuel that can be added to a fuel tank yet still provide a pump operator with a limited opportunity to use the trickle fill method after automatic pump nozzle shutoff.

During normal filling, as shown in FIG. 2, fuel vapor 44 that is displaced and or generated during refueling is forced out of vapor space 38 through venting outlet 46 for delivery to canister 24. Fuel vapor can be generated in vapor space 38 during refueling due to splash and agitation of the dispensed fuel as well as from potential temperature differences between the fuel tank and the dispensed fuel. In addition, as the liquid fuel dispensed at the pump fills the vehicle fuel tank, fuel vapors that are present in the tank and generated during refueling are displaced by liquid fuel. These displaced fuel vapors are moved out of the vapor space 38 by the displacing action of the newly introduced liquid fuel. Illustratively, the tank pressure in vapor space 38 varies between two and eight inches of water due to variables such as fill rate, heat, fuel volatilities, etc. The maximum vapor system back pressure is limited by the inlet pressure in filler neck 14 generated by the vertical height of filler neck 14 above tank level and the velocity and pressure of the incoming stream of fuel entering fuel tank 12 through the filler neck 14.

The tank vapor venting activity illustrated in FIG. 2 will continue until the level of liquid fuel reaches the bottom edge 56 of the annular skirt 52. At this level, the volume of liquid fuel in the fuel tank 12 is equivalent to the predetermined maximum fuel capacity of the fuel tank 12.

Figure 3:
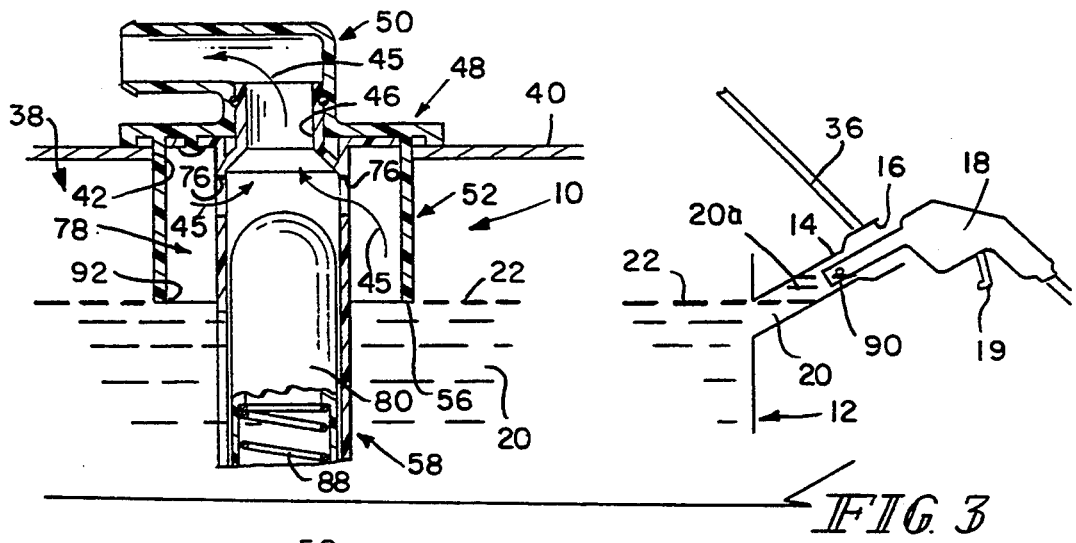
FIG. 3 is a view similar to FIG. 2 including a diagrammatic view of the fuel tank and a pump nozzle in the tank filler neck and showing that liquid fuel backs up through the filler neck to reach a fill-limiting sensor on the pump nozzle once the fuel level in the tank rises to reach the bottom edge of the skirt around the valve housing.

The nozzle 18 is shut off automatically a first time as shown in FIG. 3 once a fill-limiting sensor 90 of pump nozzle 18 is exposed to liquid fuel 20 that has backed up in the filler neck 14. The reason that liquid fuel 20 backs up or collects in the filler neck 14 to reach the fill-limiting sensor 90 on pump nozzle 18 is as follows: Once the top surface 22 of liquid fuel 20 in fuel tank 12 rises to reach and engage the bottom edge 56 of skirt 52, the liquid fuel 20 occludes or closes the annular downwardly opening inlet 92 into the annular channel 78. The liquid fuel will not rise inside the annular channel 78 at this stage of refueling because of the viscosity of the liquid fuel and the sudden change in inlet pressure required to force the fuel through the annular passage quickly momentarily exceeds that available at the filler neck from the velocity of incoming fuel. Until the liquid level in fuel tank 12 later falls, no more fuel vapor in vapor space 38 can be discharged out of fuel tank 12 through annular channel 78 and venting outlet 46 because the vapor inlet 92 into the annular channel 78 is closed by a "wall" of liquid fuel 20. The pressure in a vapor space 38 now begins to rise sharply to about twelve to sixteen inches of water. When the pressure in vapor space 38 rises to exceed the pressure of liquid fuel 20 flowing in filler neck 14 created by fuel velocity and column height, the liquid fuel flow in filler neck 14 will slow or "hesitate" and splash the fill limit sensor 90 on nozzle 18, shutting off the nozzle 18 automatically for the first time.

As shown in FIG. 3, and for the reasons mentioned above, the position of the bottom edge 56 of annular skirt 52 controls and defines the maximum height or level to which the top surface 22 of fuel 20 is able to rise during refueling. Since this position is controlled by tolerances affecting manufacture of skirt 52 and mounting of top plate 48 on top wall 40 of fuel tank 12, and these tolerances are relatively easy to control with precision, then it will be understood that use of fill limit valve assembly 10 makes it easy to set and define the maximum fill level and minimum vapor space in a fuel tank with great precision. Advantageously, it is easy to adapt fill limit valve assembly 10 for use in a wide variety of fuel tanks of varying volumes and configurations merely by varying the length and/or internal diameter of the skirt 52.

Figure 4:
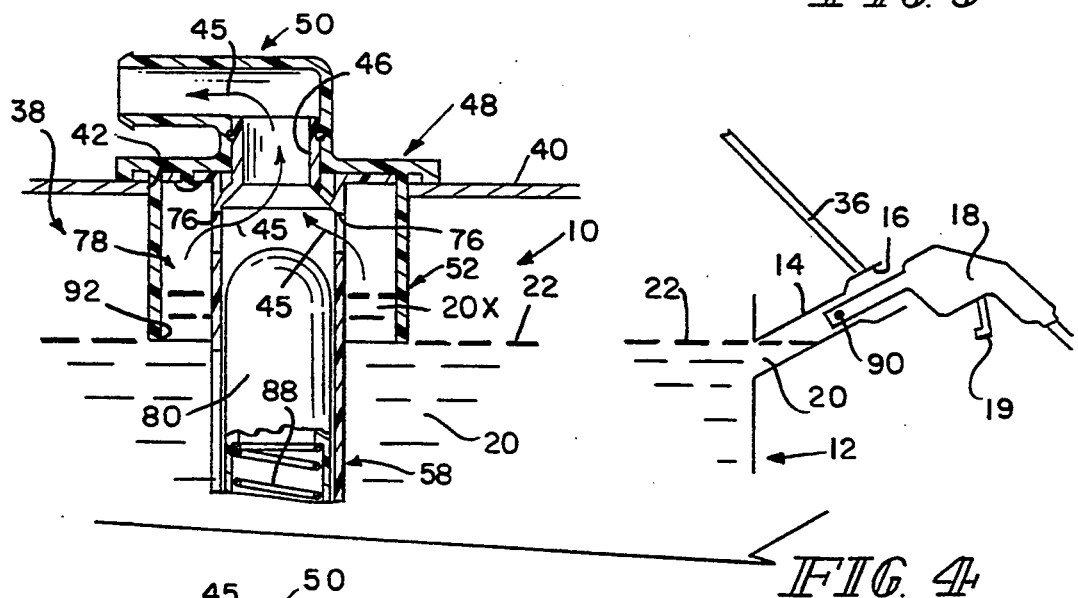
FIG. 4 is a view similar to FIG. 3 showing that after a short while some of the liquid fuel in the filler neck (see FIG. 3) drains into the fuel tank to raise the level of liquid fuel in the annular channel inside the skirt and around the valve housing.

As shown in FIGS. 3 and 4, the fuel 20a in filler neck 14 that lies above the top surface 22 of fuel 20 in fuel tank 12 will begin to drain into the fuel tank 12 just after the pump nozzle 18 has been shut off automatically. It normally takes about five to eight seconds for fuel 20a to drain into fuel tank 12 to the level shown in FIG. 4. Since this drained liquid cannot rise in pressurized vapor space 38 above the bottom edge 56 of skirt 52, it drains into tank 12 and displaces some liquid fuel 20x which is forced up into the annular channel 78 through the annular inlet 92 as shown in FIG. 4. Only vapors 45 from this displaced fuel 20x in annular channel 78 are vented through venting outlet 46 to the canister 46.

Figure 5:
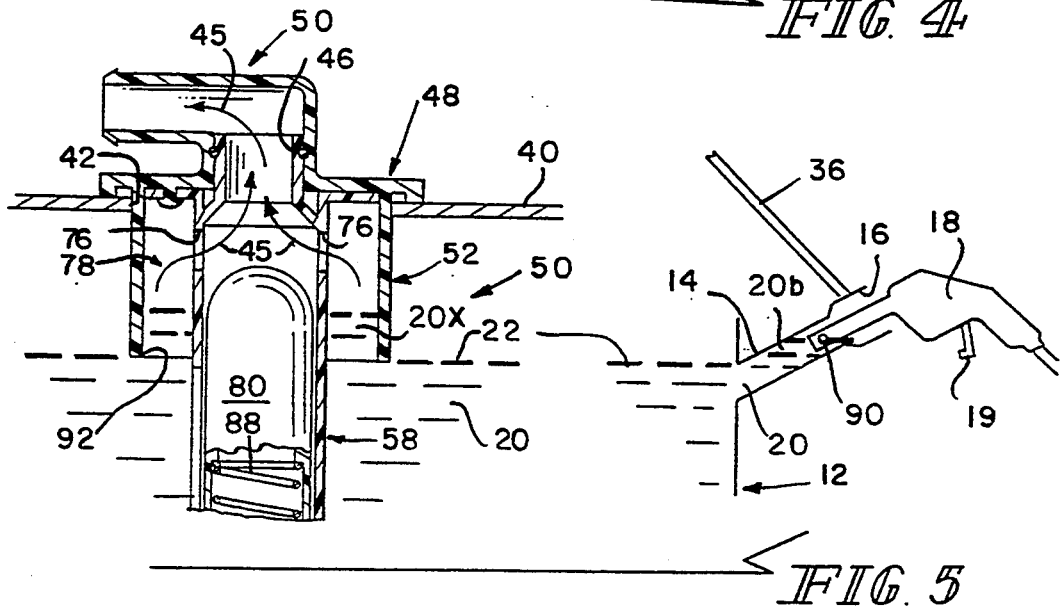
FIG. 5 is a view similar to FIGS. 3 and 4 showing that after an operator uses the pump nozzle to trickle fill more fuel into the filler neck, this extra fuel collects in the fuel neck to trigger the fill-limiting sensor on the pump nozzle and automatically shut off the pump nozzle once again.

If the pump operator clicks the pump nozzle lever handle 10 a few times slowly in succession and trickle fills liquid fuel into fuel tank 12 after the first automatic nozzle shutoff (FIG. 3) and subsequent filler neck drainage (FIG. 4) in an attempt to add more liquid fuel 20 into the fuel tank 12 than the system is apparently filling to allow, then the liquid fuel 20x added during the trickle fill step will back up in filler neck 14 as shown in FIG. 5 to reach and trigger the fill-limiting sensor 90 included in pump nozzle 18 a second time. Note that at this point there is still not enough liquid fuel 20x displaced by float valve 80 to generate enough buoyant force to add to the lifting force generated by compression spring 88 to move the float valve 80 upwardly to engage the valve seat 82 and close the venting outlet 46.

As shown in FIG. 5 and 6, the liquid fuel 20b in filler neck 14 drains into the fuel tank 12 following the second automatic shutoff of pump nozzle 18. This liquid fuel 20b drains into tank 12 and displaces some more liquid in the tank to cause the liquid fuel 20x in annular channel 78 to rise to a level high enough to close float valve 80. Once the sum of the upwardly directed buoyancy force applied to float valve 80 and the upwardly directed spring force applied by spring 88 to float valve 80 exceed the downwardly directed weight of float valve 80, then float valve 80 will move upward (i.e., "float") as shown in FIG 6 to its position closing venting outlet 46. It will be understood that the buoyancy force applied to float valve 80 is a function of the density of the float valve 80 and the volume of liquid fuel displaced by the float valve 80.

If a third trickle fill is completed, then the extra liquid fuel 20c added during the trickle filling will back up the filler neck 14 to shut off the nozzle 18 for a third time as shown in FIG. 7. In any event, the float valve 80 closes the venting outlet to block discharge of fuel vapor or liquid fuel to the canister 24 through venting outlet 46.

As shown in FIG. 8, it is possible to change the sensitivity of the fill limit valve assembly 10 by forming a slot or other opening (e.g., aperture) in the bottom edge 56 of the skirt 52. The purpose of such a slot is to cause the pump nozzle 18 to shut off a first time once liquid fuel reaches bottom edge 56 before maximum tank capacity is reached during refueling so that the pump operator has more latitude to trickle fill before the fuel tank 12 is filled to capacity and liquid fuel reaches the top of the slot causing the pump nozzle 18 to shut off automatically.

A vertical slot 93 is formed in a bottom portion 94 of the annular side wall 54 of skirt 52 as shown in FIG. 8. The top boundary of vertical slot 93 is defined by a ceiling 96 provided in annular side wall 54. Alternatively, an aperture such as aperture 97 formed in skirt 56 could be used in place of slot 93.

In use, a first automatic nozzle shutoff will occur once the level top surface 22 of fuel 20 in fuel tank 12 rises to level 100 and reaches bottom edge 56. The slot 93 is not large enough in width to disrupt the continuity of bottom edge 56 and prevent rising liquid fuel from occluding or closing annular inlet 92 to initiate the events leading to automatic nozzle shutoff. However, the slot 93 does permit some venting of fuel vapor 95 from vapor space 38 to occur after fuel level reaches bottom edge 56 and will allow a pump operator to trickle fill "without penalty" until the liquid level finally rises to the level 101 defined by slot ceiling 96. At this point, no more vapor space venting can occur and the minimum volume of vapor space 38 is preserved.

It is within the scope of the present invention to replace skirt 52 with a suitable vent tube (not shown) having an open inlet end positioned at the level of skirt bottom edge 56 and an open outlet end coupled in fluid communication to one or more of the vapor inlet openings 76 formed in the valve housings. This vent tube could lie wholly or partly within the fuel tank 12 and could be L-shaped. In use, rising fuel level with fuel tank 12 would occlude the inlet opening of vent tube in the same manner that it occludes the annular opening 92 into annular channel 78. However, a vent tube of the type just described could be positioned in spaced-apart relation to valve housing 58 without requiring valve housing 58 to pass through the vent tube.

Although the invention has been described and defined in detail with reference to certain preferred embodiments, variations and modifications exist within the scope and spirit of the invention as described and defined in the following claims.

I claim:

1. An apparatus for controlling discharge of fuel vapor from within a vehicle fuel tank, the apparatus comprising
    a valve housing adapted to be mounted in a top wall of the fuel tank, the valve housing being formed to include a vapor inlet opening adapted for communicating with an interior region of the fuel tank, a vapor outlet opening, and a passageway interconnecting the vapor inlet opening and the vapor outlet opening,
    a float valve disposed in the valve housing and movable between an open position allowing flow of fuel vapor through the vapor outlet opening and a closed position preventing flow of fuel vapor through the vapor outlet opening, and
    a skirt adapted to be positioned to lie inside the fuel tank and extending around the valve housing and the vapor inlet opening in the valve housing to define an annular channel lying around the valve housing and adapted to conduct fuel vapor from the interior region of the fuel tank to the vapor inlet opening, the skirt having a bottom edge adapted to lie in spaced-apart relation to the top wall of the fuel tank and the vapor inlet opening in the valve housing being adapted to be located in a position between the top wall of the fuel tank and the bottom edge of the fuel skirt, the bottom edge of the skirt being positioned to lie in coextensive relation with a top surface of liquid fuel in the interior region of the fuel tank once the volume of liquid fuel in the fuel tank is equal to a predetermined maximum fuel capacity of the fuel tank.

2. The apparatus of claim 1, wherein the skirt includes a top wall coupled to the valve housing and an annular side wall appended to the top wall and positioned to surround the valve housing and define the annular channel therebetween.

3. The apparatus of claim 2, wherein the annular side wall includes the bottom edge and a top edge appended to the top wall and positioned to lie in spaced-apart relation to the bottom edge.

4. The apparatus of claim 2, wherein the valve housing includes a tubular conduit having a bottom end, an opposite top end formed to include the vapor outlet opening and appended to the top wall of the skirt, and a side wall extending between the top and bottom ends, the top and annular side walls of the skirt cooperate to define a bottom-opening interior chamber, and the side wall of the valve housing is formed to include the valve inlet opening lying in the bottom-opening interior chamber and facing toward the annular side wall of the skirt.

5. The apparatus of claim 4, wherein the float valve includes a tip engaging the vapor outlet upon movement of the float valve to the closed position and further comprising spring means for yieldably urging the float valve toward the vapor outlet opening normally to position the tip adjacent to the vapor inlet opening formed in the side wall of the valve housing.

6. The apparatus of claim 1, further comprising spring means for assisting in moving the float valve toward the closed position as liquid fuel in the fuel tank rises above a predetermined level.

7. The apparatus of claim 6, wherein the spring means is positioned in the valve housing to lie below and in spaced-apart relation to the bottom edge of the skirt.

8. The apparatus of claim 1, wherein the bottom edge is an endless annular rim.

9. The apparatus of claim 8, wherein the valve housing includes an exterior side wall formed to include at least one liquid fuel opening lying in spaced-apart relation to the vapor outlet opening, the vapor inlet opening is formed in the exterior side wall to lie between the at least one liquid fuel opening and the vapor outlet opening, the exterior side wall includes a midportion between the at least one fuel opening and the vapor inlet opening, and the midportion and the bottom edge cooperate to define inlet means adapted to admit fuel vapor from the fuel tank into the annular channel to conduct fuel vapor to the vapor outlet opening via the vapor inlet opening and the passageway until liquid fuel in the fuel tank rises to a level engaging the entire endless annular rim during refueling so that once the endless annular rim is engaged by liquid fuel all flow of fuel vapor from the fuel tank through the annular channel, vapor inlet opening, passageway, and vapor outlet opening stops.

10. The apparatus of claim 9, wherein the skirt includes a top wall coupled to the valve housing and an annular side wall appended to the top wall and positioned to surround the valve housing and define the annular channel therebetween, and the annular side wall includes the bottom edge and a top edge appended to the top wall and positioned to lie in spaced-apart relation to the bottom edge.

11. The apparatus of claim 9, wherein the tubular member includes an interior wall and the valve housing includes an exterior wall containing the vapor inlet opening and lying in spaced-apart relation to the interior wall to define a fuel vapor-conducting annular channel therebetween and around the valve housing.

12. An apparatus for controlling discharge of fuel vapor from a vehicle fuel tank, the apparatus comprising
    a valve housing adapted to be mounted in a top wall of the fuel tank, the valve housing being formed to include a vapor inlet opening adapted for communicating with an interior region of the fuel tank, a vapor outlet opening, and a passageway interconnecting the vapor inlet opening and the vapor outlet opening, the valve housing being formed to include a top end including the vapor outlet opening and an opposite bottom end, a float valve disposed in the valve housing and movable between an open position allowing flow of fuel vapor through the vapor outlet opening and a closed position preventing flow of fuel vapor through the vapor outlet opening, and means for conducting fuel vapor to the vapor inlet opening formed in the valve housing, the conducting means including a tubular member positioned to lie adjacent to the valve housing and defining an inlet for conducting vapor to the vapor inlet opening from a point below the vapor inlet.

13. The apparatus of claim 12 wherein the valve housing is positioned to extend through the fuel vapor-receiving opening.

14. The apparatus of claim 13, wherein the conducting means further includes means for mounting the tubular member in a fixed position relative to the valve housing, the tubular member includes a top end adjacent to the vapor outlet opening and an opposite bottom end, and the mounting means interconnects the top end of the tubular member and the top end of the valve housing.

15. The apparatus of claim 12, wherein the valve housing includes an exterior wall and the tubular member includes an interior wall lying in spaced-apart relation to the exterior wall of the valve housing.

16. The apparatus of claim 15, wherein the interior wall is positioned to surround the exterior wall.

17. The apparatus of claim 12, wherein the valve housing includes an exterior side wall formed to include at least one liquid fuel opening lying in spaced-apart relation to the vapor outlet opening, the vapor inlet opening is formed in the exterior side wall to lie between the at least one liquid fuel opening and the vapor outlet opening, the tubular member includes a top end adjacent to the vapor outlet opening and an opposite bottom end defining an endless annular rim, the exterior side wall includes a midportion between the at least one fuel opening and the vapor inlet opening, and the midportion and the bottom edge cooperate to define inlet means adapted to admit fuel vapor from the fuel tank into the annular channel to conduct fuel vapor to the vapor outlet opening via the vapor inlet opening and the passageway until liquid fuel in the fuel tank rises to a level engaging the entire endless annular rim during refueling so that once the endless annular rim is engaged by liquid fuel all flow of fuel vapor from the fuel tank through the annular channel, vapor inlet opening, passageway, and vapor outlet opening stops.

18. An apparatus for controlling discharge of fuel vapor from a vehicle fuel tank having a filler neck provided with an inlet mouth for receiving a fuel-dispensing nozzle therein, the apparatus comprising means adapted for venting fuel vapor from a vapor space in the fuel tank above liquid fuel contained in the fuel tank to an outside space, primary shut-off means adapted for using rising liquid fuel in the fuel tank introduced into the fuel tank during refueling to block fuel vapor in the vapor space in the fuel tank from entering the venting means so that tank pressure in the vapor space in the fuel tank rises to exceed a predetermined pressure to push liquid fuel through the filler neck toward the inlet mouth to reach and shut off a fuel-dispensing nozzle inserted into the filler neck, and secondary shut-off means adapted for blocking flow of fuel vapor from the fuel tank through the venting means, the secondary shut-off means including a valve housing coupled to the venting means and formed to include a vapor inlet opening adapted for receiving fuel vapor from the fuel tank and a passageway interconnecting the vapor inlet opening and the venting means, the secondary shut-off means further including a float valve disposed in the valve housing and movable between an open position allowing flow of fuel vapor through the venting means and a closed position preventing flow of fuel vapor through the venting means.

19. The apparatus of claim 18, wherein the venting means includes a fixture adapted to be mounted in a wall of the fuel tank and formed to include a vapor outlet opening communicating with the vapor inlet opening formed in the valve housing and the primary shut-off means includes a tubular member adapted to lie inside the fuel tank and configured to conduct fuel vapor from the vapor space in the fuel tank to the vapor inlet opening in the valve housing.

20. The apparatus of claim 19, wherein the tubular member is formed to include a fuel vapor-conducting passageway communicating fuel vapor from the vapor space to the vapor inlet opening and a portion of the valve housing lies in the fuel vapor-conducting passageway.

21. The apparatus of claim 20, wherein the primary shut-off means further includes means for mounting the tubular member in a fixed position relative to the valve housing, the tubular member includes a top end adjacent to the vapor outlet opening and an opposite bottom end, and the mounting means interconnects the top end of the tubular member and the top end of the valve housing.

22. The apparatus of claim 19, wherein the tubular member includes an interior wall and the valve housing includes an exterior wall containing the vapor inlet opening and lying in spaced-apart relation to the interior wall to define a fuel vapor-conducting annular channel therebetween and around the valve housing.

23. The apparatus of claim 19, wherein the valve housing includes an exterior wall and the tubular member includes an interior wall lying in spaced-apart relation to the exterior wall of the valve housing.

24. The apparatus of claim 23, wherein the interior wall is positioned to surround the exterior wall.

25. The apparatus of claim 18, wherein the venting means includes a fixture adapted to be mounted in a wall of the fuel tank and formed to include a vapor outlet opening communicating with the vapor inlet opening formed in the valve housing and the primary shut-off means includes a skirt adapted to lie inside the fuel tank and extend around the valve housing and the vapor inlet opening in the valve housing to define an annular channel lying around the valve housing and adapted to conduct fuel vapor from the vapor space in the fuel tank to the vapor inlet opening, the skirt having a bottom edge adapted to lie in spaced-apart relation to a top wall of the fuel tank to locate the vapor inlet opening in the valve housing in a position between the top wall of the fuel tank and the bottom edge, the bottom edge of the skirt being positioned to lie in coextensive relation with a top surface of liquid fuel in the vapor space in the fuel tank once the volume of liquid fuel in the fuel tank is equal to a predetermined maximum fuel capacity of the fuel tank.

26. The apparatus of claim 25, wherein the fixture is adapted to be coupled to a top wall of the fuel tank, the valve housing is coupled to the fixture, and the skirt is an annular wall appended to the fixture and positioned to surround the valve housing and define the annular channel therebetween.

27. The apparatus of claim 26, wherein the annular wall includes the bottom edge and a top edge appended to the fixture and positioned to lie in spaced-apart relation to the bottom edge.

28. The apparatus of claim 26, wherein the valve housing includes a tubular conduit having a bottom end, an opposite top end formed to include the vapor outlet opening and appended to the fixture, and a side wall extending between the top and bottom ends, the top and annular side walls of the skirt cooperate to define a bottom-opening interior chamber, and the side wall of the valve housing is formed to include the valve inlet opening lying in the bottom-opening interior chamber and facing toward the annular side wall of the skirt.

29. The apparatus of claim 28, wherein the float valve includes a tip engaging the vapor outlet upon movement of the float valve to the closed position and further comprising spring means for yieldably urging the float valve toward the vapor outlet opening normally to position the tip adjacent to the vapor inlet opening formed in the side wall of the valve housing.

30. The apparatus of claim 18, further comprising spring means for assisting in moving the float valve toward the closed position as liquid fuel in the fuel tank rises above a predetermined level.

31. The apparatus of claim 30, further comprising a Skirt positioned to extend around the valve housing and the vapor inlet opening in the valve housing to define an annular channel lying around the valve housing, the skirt having a bottom edge lying in spaced-apart relation to a top wall of the fuel tank to locate the vapor inlet opening in the valve housing in a position between the top wall of the fuel tank and the bottom edge, and the spring means is positioned in the valve housing to lie below and in spaced-apart relation to the bottom edge of the skirt.

32. An apparatus for controlling discharge of fuel vapor from a vehicle fuel tank, the apparatus comprising a valve housing adapted to be mounted in a top wall of the fuel tank, the valve housing being formed to include a vapor inlet opening adapted to communicate with an interior region of the fuel tank, a vapor outlet opening, and a passageway interconnecting the vapor inlet opening and the vapor outlet opening, a float valve disposed in the valve housing and movable between an open position allowing flow of fuel vapor through the vapor outlet opening and a closed position preventing flow of fuel vapor through the vapor outlet opening, and a skirt adapted to lie inside the fuel tank and extend around the valve housing and the vapor inlet opening in the valve housing to define an annular channel adapted to lie around the valve housing and conduct fuel vapor from the interior region of the fuel tank to the vapor inlet opening, the skirt having a bottom edge adapted to lie in spaced-apart relation to the top wall of the fuel tank to locate the vapor inlet opening in the valve housing in a position between the top wall of the fuel tank and the bottom edge, the skirt being formed to include an opening adjacent to the bottom edge and a ceiling defining the upper boundary of the opening, the ceiling being positioned to lie in coextensive relation with a top surface of liquid fuel in the interior region of the fuel tank once the volume of liquid fuel in the fuel tank is equal to a predetermined maximum fuel capacity of the fuel tank.

33. The apparatus of claim 32, wherein the skirt is formed to include a vertical elongated slot defining the opening.

34. The apparatus of claim 32, wherein the skirt is formed to include an aperture defining the opening.

* * * * *